United States Patent [19]

Russell et al.

[11] Patent Number: 4,855,675
[45] Date of Patent: Aug. 8, 1989

[54] INDUCTIVE TRANSDUCERS FOR INDICATING ESTABLISHMENT OF A PRESELECTED SPATIAL RELATIONSHIP BETWEEN TWO PARTS

[75] Inventors: Alexander Russell, Glasgow, Scotland; Leslie A. Cooper, Lymington; David P. Drudy, Rownhams, both of England

[73] Assignee: Sacol Powerline Limited, Southhampton, England

[21] Appl. No.: 734,891

[22] Filed: May 16, 1985

[30] Foreign Application Priority Data

May 21, 1984 [GB] United Kingdom ............... 8412937
Mar. 14, 1985 [GB] United Kingdom ............... 8506682

[51] Int. Cl.⁴ ............... G01B 7/14; G01N 27/72; G01R 33/12; H01F 15/02
[52] U.S. Cl. ............... 324/208; 324/233; 340/870.31; 336/79; 92/5 R
[58] Field of Search ............... 324/207, 208, 233; 340/870.31, 870.32, 870.35; 336/45, 30, 75, 77, 79; 92/5 R

[56] References Cited

U.S. PATENT DOCUMENTS 3,030,574  4/1962  Nissenson .
3,654,549  4/1972  Maurer et al. .
3,719,902  3/1973  Sterly ............... 336/73
3,890,607  6/1975  Pelenc et al. ............... 340/870.35
3,991,393  11/1976 Becker, Jr. .
4,013,986  3/1977  Weckenmann .
4,385,297  5/1983  Schmitt et al. ............... 324/208

FOREIGN PATENT DOCUMENTS 0039181  11/1981  European Pat. Off. .
0095267  11/1983  European Pat. Off. .
1807815  5/1970   Fed. Rep. of Germany .
2441163  3/1976   Fed. Rep. of Germany .
2630894  1/1978   Fed. Rep. of Germany .
1059029  2/1967   United Kingdom .
1256721  12/1971  United Kingdom .
2021770B 12/1979  United Kingdom .
2027207A 2/1980   United Kingdom .
2074736  4/1980   United Kingdom .
2060894B 5/1981   United Kingdom .

Primary Examiner—Reinhard J. Eisenzopf
Assistant Examiner—Walter E. Snow
Attorney, Agent, or Firm—Christensen, O'Connor, Johnson & Kindness

[57] ABSTRACT

Various forms of hydraulic cylinders having axial bores formed in their piston rods, and probes projecting axially from the closed end of the cylinder body with two spaced coils thereon are disclosed. The coils are connected into external circuitry which responds to change in inductance of either coil whereby to generate a reference signal upon the occurrence of preselected changing conditions of inductance of either coil caused by movement of that coil into or out of mutual induction with a shorted turn arrangement formed by or carried by the piston. The coils may be the drive coils of a displacement transducer arranged to indicate either end of the stroke of the piston. Alternatively either a supplementary shorted turn or an additional drive coil may be provided to generate an intermediate stroke reference signal. The reference signals may be used in operation of a system for effecting automatic continuous reciprocation of the piston.

15 Claims, 7 Drawing Sheets

U.S. Patent    Aug. 8, 1989    Sheet 1 of 7    4,855,675
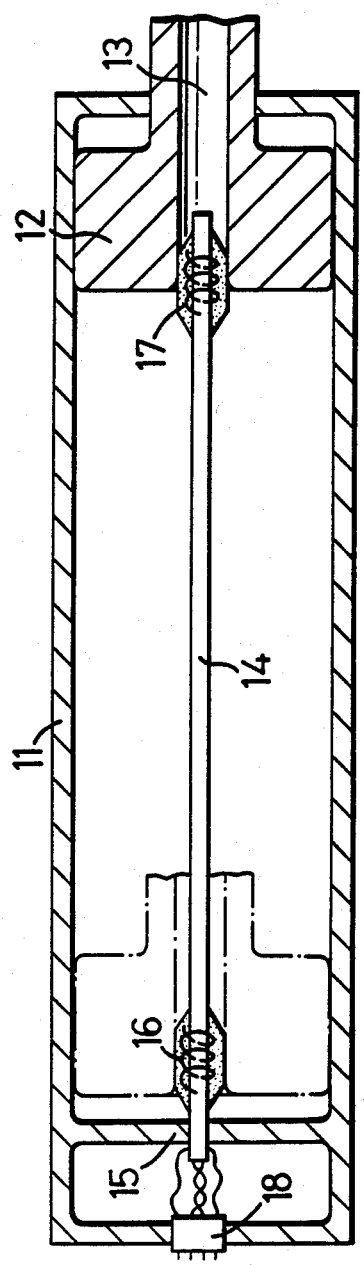
FIG.1
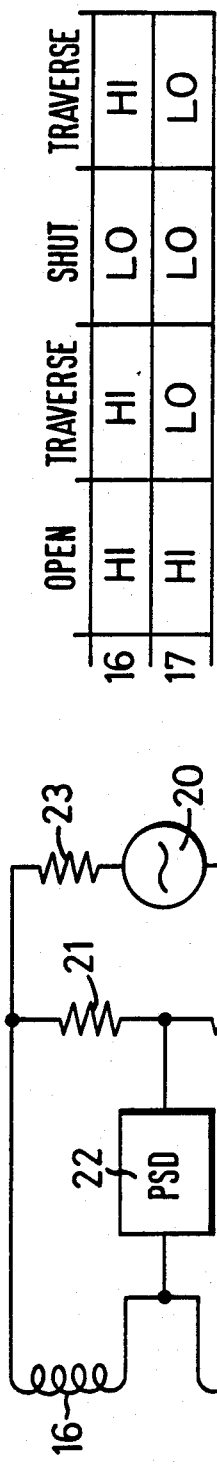
FIG.2
COIL IMPEDANCES
| | OPEN | TRAVERSE | SHUT | TRAVERSE |
|---|---|---|---|---|
| 16 | HI | HI | LO | HI |
| 17 | HI | LO | LO | LO |
FIG.3

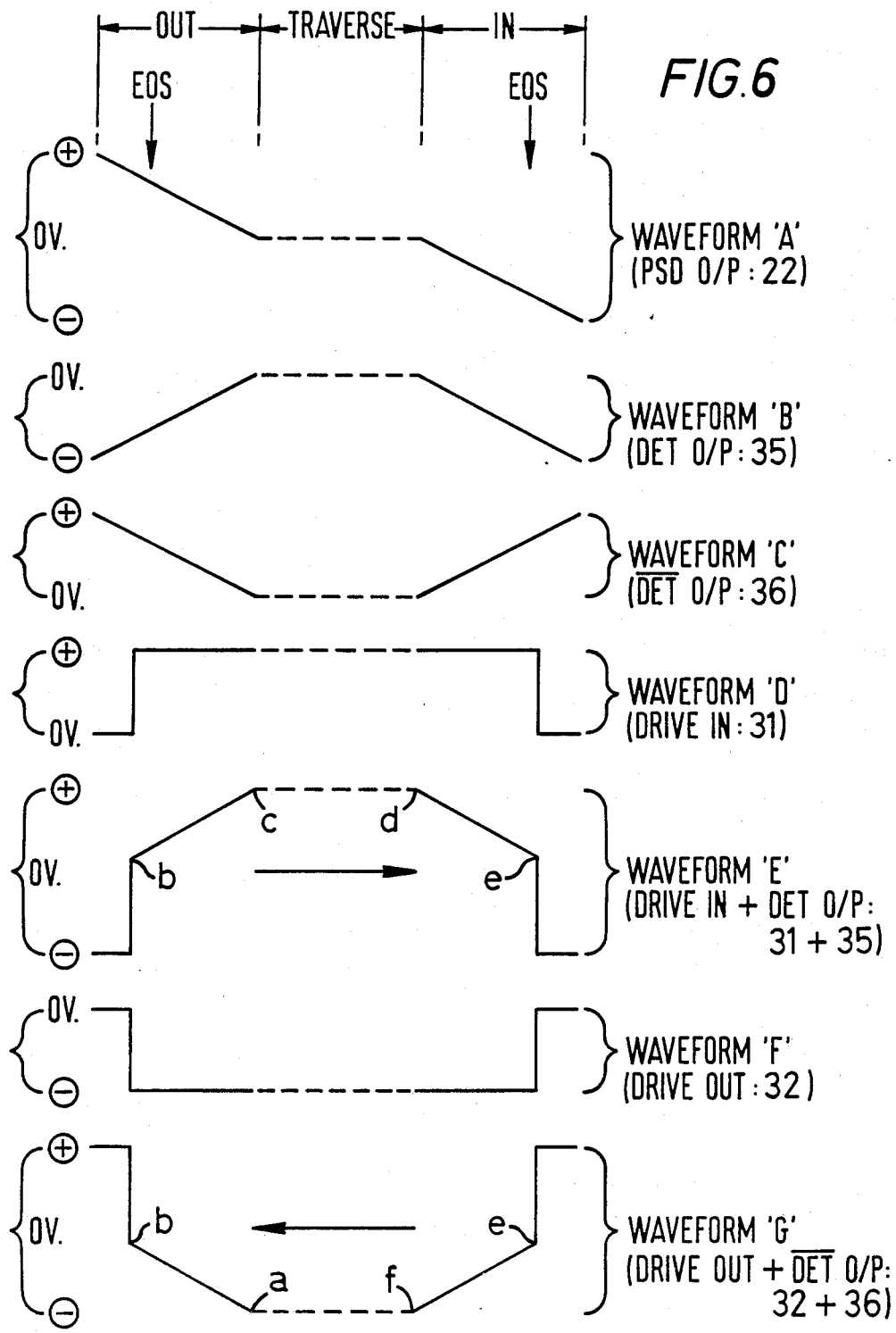

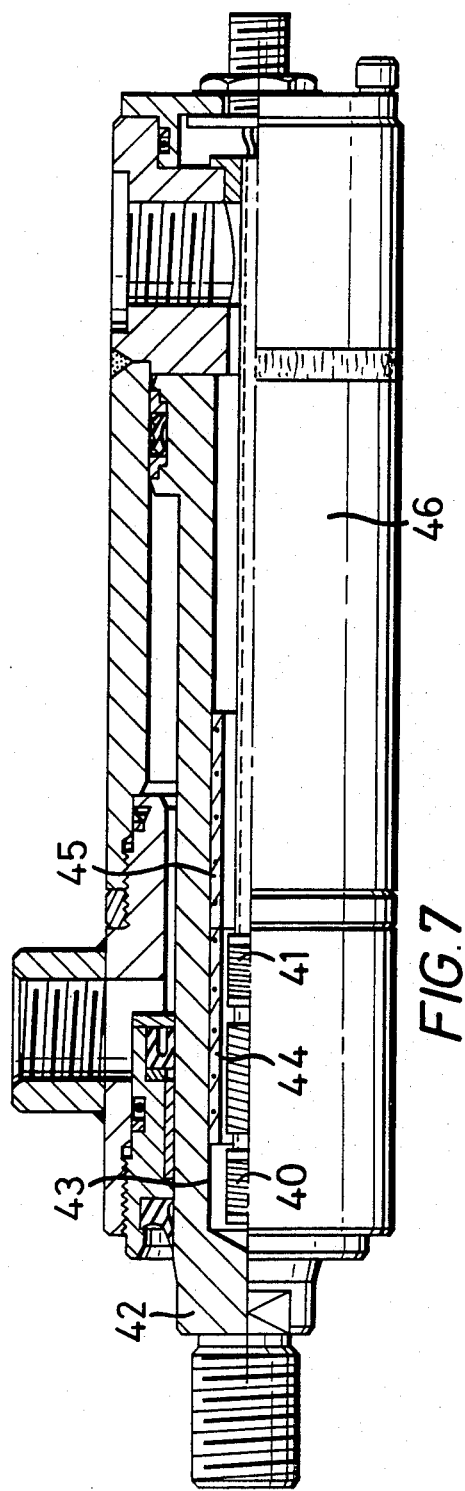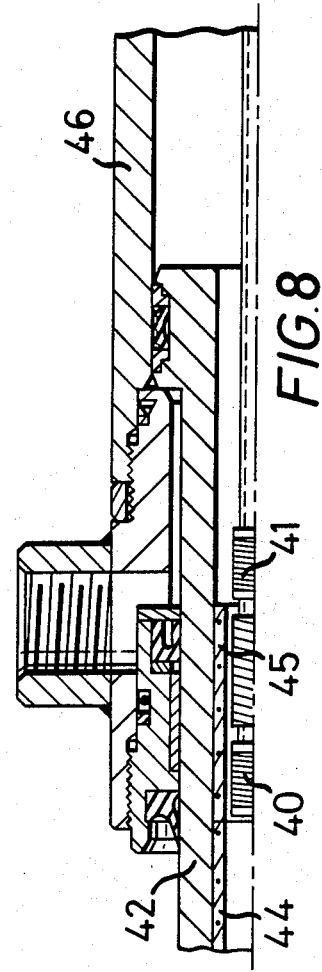

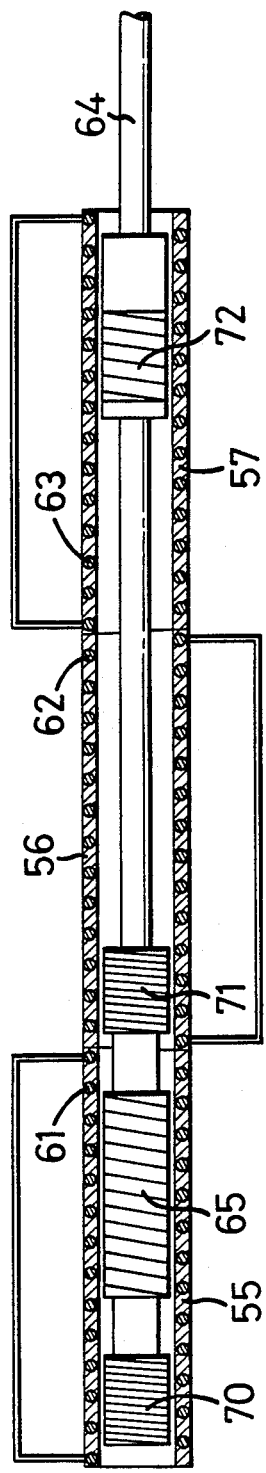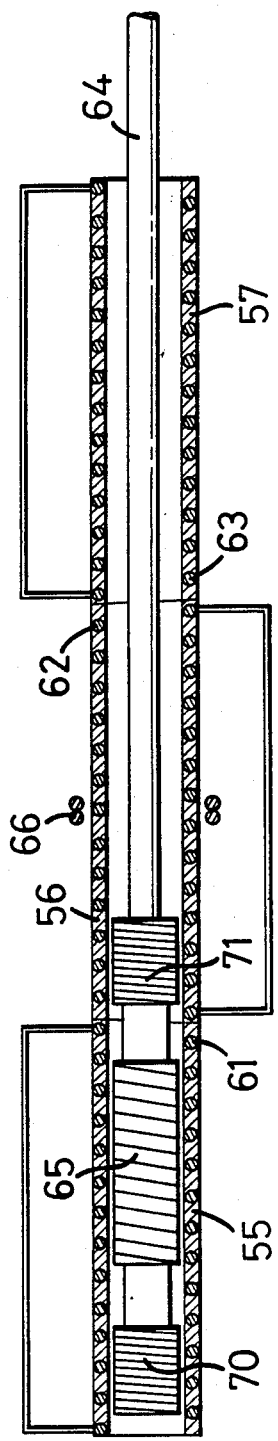

INDUCTIVE TRANSDUCERS FOR INDICATING ESTABLISHMENT OF A PRESELECTED SPATIAL RELATIONSHIP BETWEEN TWO PARTS

DESCRIPTION

This invention relates to an inductive transducer for deriving an output signal from relative movement between two relatively displaceable parts.

Various forms of inductive transducer which are operable to derive an electrical output signal from relative movement between two relatively displaceable parts are known. They comprise a coil fixedly supported by a first of the two parts, a shorted turn arrangement incorporated in the second part and means which are responsive to an electrical characteristic of the coil which varies as the shorted turn arrangement traverses the coil and which are operable to produce the electrical output signal in response to such variations in the electrical characteristic of the coil.

Usually such transducers are used to indicate displacement of one of the parts relative to the other part from a preselected location relative to that other part and many are arranged so that the output signal is a measure of that displacement. Such transducers are disclosed in GB-A-Nos. 1059029, GB-A-1256721, GB-A-2021770, GB-A-2027207, GB-A-2060894 and GB-A-2074736; DE-A-Nos. 1807815 and DE-A-2630894; EP-A-Nos. 0039181, and EP-A-0095267; and U.S. Pat. Nos. 3,030,574, 3,654,549, and 3,991,393. One such transducer, which is a displacement measurement device, forms the subject of the co-pending European Patent Application No. 84307768.6 filed 9th Nov. 1984, (which is covered by the provisions of Article 54(3) EPC), the co-pending Canadian Patent Application Serial No. 467078 filed 5th Nov. 1984 and U.S. patent application Ser. No. 668,749 filed 6th Nov. 1984, now U.S. Pat. No. 4,644,355.

There is a need to establish a reference or datum for displacement measurement by such a transducer as it is incremental in operation. There can be a need for an indication of when one of two relatively displaceable parts is located at a preselected location relative to the other part. For example there is a need for indication at a remote location of the arrival of a piston of an hydraulic cylinder at either end of its stroke or at a certain intermediate location between the ends of its stroke.

Although a microswitch may be provided in a displacement measurement device which is operable to measure relative displacement between two parts, the microswitch being located on one of the parts at a selected one of a range of locations extending through the stroke of relative movement between the two parts, and being arranged to be tripped by a cam device carried by the other part as it is passed by that cam device so that a signal emitted by the microswitch when it is tripped can be used as a pilot signal which sets a signal processing system to record that signal as a datum for displacement measurement, use of a microswitch is not desirable because it cannot be fitted to operate inside the cylinder and thus takes up space. Also it is vulnerable and unreliable.

U.S. Pat. No. 3,030,574 acknowledges that problem and teaches use of a bridge circuit which has a series of coils in one of its arms, the coils being fixedly supported by one of the two parts so that they are traversed by a shorted turn arrangement incorporated in the other part during relative movement between the two parts. The bridge circuit is arranged to be in electrical balance at the reference location so that any out of balance indication is a measure of relative displacement from the reference location. Such an arrangement has the disadvantage that only one reference location can be set. It cannot be arranged to indicate arrival of one of the parts at either end of its stroke and/or at a selected point intermediate those ends.

Use of a Hall effect sensor as such means to establish a datum for displacement measurement is not practical as the sensor has to be replaced whenever the stroke is altered.

An object of this invention is to provide means which can be used to indicate movement of one of two relatively displaceable parts to or from a preselected location in a stroke of such movement, which may be used to establish a datum for displacement measurement, which are reliable in operation, which allow for stroke variation and which have the facility for being set to establish a datum or reference at one or more selected locations within the stroke.

DE-A-No. 2630894 discloses a number of different forms of inductive transducer which include a winding which develops an alternating magnetic field, and various forms of short circuit means which are passed over the winding so as to block the alternating magnetic field. The total magnetic flux depends on the position of the short circuit means, relative to the winding. As a result there is a change in the self inductance of the winding with movement of the short circuit means. Such change in the inductance of the winding may be detected in an appropriate electronic circuit.

It is possible to obtain an S-shaped characteristic of variation of self inductance if a short circuit tube, which is longer than the winding, is used and if the winding is arranged to develop a non-homogeneous magnetic field as is described with reference to and illustrated in FIG. 4 of DE-A-No. 2630894. Such a characteristic is required for axle load determination for the levelling control in vehicles. At both ends of the range of movement of the tube relative to the winding further movement of the tube has no affect on the self inductance of the winding. When the winding is fully covered by the tube, eddy currents in the latter compensate the exitation of current completely. When the short circuit tube is fully withdrawn, the magnetic field developed by the winding is constant.

The present invention arises from an appreciation that the junction between such a constant portion of an output signal from such a transducer and a juxtaposed varying signal portion can be used as a datum or reference when monitoring or measuring movement between two parts. Also an instant when the value of the juxtaposed varying portion of the signal differs from the constant portion of the signal by a preselected amount can be used as such a datum or reference.

Accordingly the present invention comprises an inductive transducer for deriving an output signal from relative movement between two relatively displaceable parts, comprising a coil fixedly supported by a first of the two parts, a shorted turn arrangement incorporated in the second part such that it is movable into and out of mutual induction with the coil during relative movement between the two parts, and means which are responsive to change in inductance of the coil and which are operable to emit an output signal, wherein the transducer is adapted to indicate establishment of a preselected spatial relationship between the two parts by indicating when predetermined transient conditions related to a change in the inductance of the coil between constant and varying conditions of the inductance of the coil which occur as the coil moves into and out of mutual induction with the shorted turn arrangement are established.

Preferably the coil is one of at least two coils fixedly supported by said first part substantially coaxially with and spaced from one another in the direction of relative movement between the two parts, the shorted turn arrangement being in mutual induction with each of the coils at respective parts of the range of possible relative movement between the two parts. In one embodiment there are two coils and the means operable to emit an output are operable to emit such an output signal when the inductance of both the coils is the same. In other embodiments where there are two or more coils, the means operable to emit an output are operable to emit such an output when the inductance of the coils is not the same because one of them is not inductively linked with the shorted turn arrangement whilst the remainder is.

The means responsive to change in the inductance of the or each coil are operable to emit a signal which changes progressively with change of inductance as the respective predetermined spatial relationship is approached, the means operable to emit an output being responsive to the signal and being adapted to emit the signal when the signal has a predetermined magnitude.

The fixed support of the or each coil on said first part may be adjustable.

In a preferred embodiment the two coils on the first part, or two of the coils on the first part, are drive coils of a displacement measurement device which forms the subject of the co-pending European Patent Application No. 84307768.6 filed 9th Nov. 1984, the co-pending Canadian Patent Application Serial No. 467078 filed 5th Nov. 1984 and the U.S. patent application Ser. No. 668749 filed 6th Nov. 1984, now U.S. Pat. No. 4,644,355, which is operable to measure relative displacement between the two parts and which also comprises an output coil arrangement which is mounted on the first part substantially coaxially with and between the two drive coils, and an intermediate coil arrangement which comprises the shorted turn arrangement mounted on the other of the two parts substantially coaxially with the drive coils and the output coil arrangement, the device being arranged such that, in operation of it, the drive coils are energised simultaneously by an applied alternating current signal so that alternating current flow is induced through the intermediate coil arrangement and through the output coil arrangement by the applied alternating current flow through the drive coils and by the induced current flow through the intermediate coil arrangement respectively, the current flow through the output coil arrangement serving as an output signal which is indicative of measured relative displacement between the two parts.

Alternatively or additionally a displacement measurement device which forms the subject of the aforesaid co-pending European, Canadian and U.S. Patent Applications may be provided with means which are operable to indicate when one of the two parts is at a selected location relative to the other between the ends of the stroke of relative movement between the two parts, said means comprising a coil element and an associated shorted turn element which are each fitted to a respective one of the two parts such that, as said one part moves to said preselected location, the inductance of the coil element is changed by movement of it into or out of mutual induction with the shorted turn element. The coil element may be one of the drive coils and the shorted turn element a subsidiary shorted turn coil which is mounted on said other part such that said one drive coil is also in mutual induction with said shorted turn coil arrangement when it is in mutual induction with it and such that it is radially spaced sufficiently from the axis of said drive coils and the output coil arrangement for it to have virtually no effect on the strength of said output signal. Alternatively the coil element may be a third drive coil which is supported by said first part substantially coaxially with the other two drive coils and the output coil arrangement, the shorted turn element comprising said shorted turn coil arrangement, the third drive coil being spaced from the nearer of the other two drive coils by a distance which is at least the sum of the length of either of the other two drive coils and the distance between the magnetic centres of the other two drive coils.

Examples of devices in which this invention is embodied, applied to an hydraulic cylinder, are described now with reference to the accompanying drawings, of which:

FIG. 1 is a diagram illustrating an hydraulic cylinder fitted with one form of a device in which this invention is embodied;

FIG. 2 is an electrical circuit diagram of the electrical circuitry of the device that is fitted to the hydraulic cylinder shown in FIG. 1;

FIG. 3 is a table indicating the states of the impedances of the two coils of the device in various different conditions of the hydraulic cylinder shown in FIG. 1;

FIG. 6 is a diagram of waveforms generated during operation of the circuitry illustrated in FIG. 5, the abscissae being in terms of displacement;

FIG. 7 is a partly sectioned elevation of an hydraulic cylinder to which a displacement measurement device incorporating this invention, has been fitted;

FIG. 8 is a sectioned fragment of the hydraulic cylinder shown in FIG. 7 in its fully extended condition;

Figure 4:
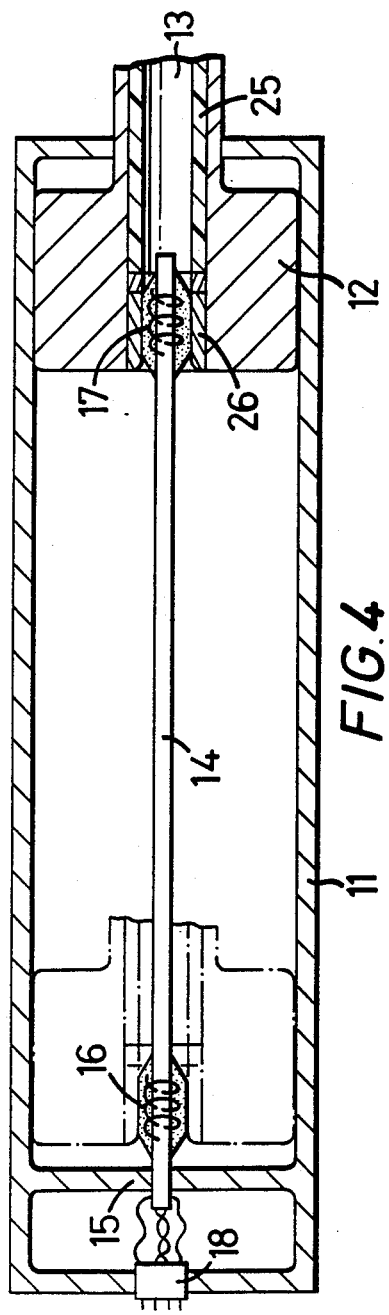
FIG. 4 is a diagram similar to FIG. 1 illustrating a modification of the device that is fitted to the hydraulic cylinder shown in FIG. 1.

FIG. 11 illustrates another embodiment of this invention and is a diagram: of the arrangement of the drive coils, the output coil arrangement and shorted turn coil arrangement of another form of displacement transducer which is suitable for fitting into the hydraulic cylinder shown in FIG. 7, together with an extra drive coil which is operable to indicate when the piston to which it is fitted is at a preselected location relative to the cylinder between the ends of the stroke of the piston; and FIG. 12 illustates a further embodiment of the invention and is a diagram similar to FIG. 11 illustrating provision of a subsidiary shorted turn coil arrangement on the cylinder as an alternative to the extra drive coil of the embodiment illustrated in FIG. 11, the subsidiary shorted turn coil arrangement being operable to effect a change in the inductance of one of the drive coils when the piston is at a preselected location relative to the cylinder between the ends of the stroke of the piston and thereby to effect an indication of that condition.

In order to measure the inductance or change in inductance of a coil it is convenient to measure the impedance or change in impedance of the coil where a constant frequency AC power supply is applied to the coil and where the resistance of the coil is negligable and can be ignored. Such conditions prevail in the embodiments of this invention described below.

FIG. 1 shows a single ended hydraulic cylinder having a casing 11 and a piston 12. An axial bore 13 extends into the piston 12 from the end thereof within the cylinder chamber. The length of the bore 13 is substantially the same as the axial length of the cylinder chamber.

A rod 14 is fixed in the centre of the closed end wall 15 of the cylinder casing 11 and projects axially therefrom through the cylinder chamber towards the piston 12. The length of the rod 14 is such that it projects into the axial bore 13 of the piston 12 even when the piston 12 is at the end of its stroke in which the hydraulic cylinder is extended. Two coils 16 and 17 are fitted on the rod 14. Provision is made for clamping each coil at any selected respective location on the rod 14. FIG. 1 shows the coil 17 clamped on the rod 14 near the end thereof further from the closed end wall 15 such that the coil 17 is outside the bore 13 when the piston 12 is at the extreme end of its stroke remote from the closed end wall 15 but such that it is received within the bore 13 as soon as the piston 12 moves away from that extreme end of its stroke towards the closed end wall 15. The coil 16 is clamped at the end of the rod 14 adjacent the closed end wall 15 such that it is only received within the bore 13 of the piston 12 as the piston 12 reaches the end of its stroke adjacent the closed end wall 15, as shown dotted in FIG. 1. Leads from the ends of the coils 16 and 17 are led from within the cylinder through a sealed socket 18.

FIG. 2 shows that the two coils 16 and 17 are connected together in series across a source 20 of constant frequency AC power, which, conveniently, is an oscillator. A centre tapping between the two coils 16 and 17 is connected to one terminal of a phase sensitive detector 22 which is balanced when both coils are outside the bore 13 of the piston 12 so that the same current flows through those coils 16 and 17 in that condition. Two substantially equal resistors 21 are connected in series across the power source 20 in parallel with the coils 16 and 17. A centre tapping between the two resistors 21 is connected to another terminal of the phase sensitive detector 22.

The output from the phase sensitive detector 22 will be zero if the impedances of the two coils 16 and 17 are equal as both inputs to the detector 22 are equal. However, if the coil impedances become unequal, a positive or negative output will appear at the output of the phase sensitive detector 22 and the sense of that output will depend upon the state of the impedance of the coils 16 and 17. The impedance of either coil 16, 17 will be high (HI) when that coil 16, 17 is outside the bore 13 of the piston 12. When either coil 16, 17 enters the bore 13, the metal shroud formed around that coil 16, 17 by the piston 12 acts as a shorted turns coil and places a load upon the coil 16, 17 or coils 16 and 17 received within the bore 13 so that the impedance of that coil 16, 17 received within the bore 13 becomes low (LO). That change in the impedance of the coil 16, 17 received within the bore 13 upsets the input balance at the phase sensitive detector 22 and causes it to present the positive or negative output.

With reference to FIG. 3, in the fully open position, the impedance of both coils 16 and 17 will be high as they are outside the bore 13, the output of the phase sensitive detector 22 will be zero because the bridge circuit incorporated in the circuit shown in FIG. 2 will be in balance. This is an end of stroke condition. When the cylinder starts to contract, the coil 17 enters the bore 13 so that its impedance goes low. The coil 16 stays outside the bore 13 and therefore its impedance remains high. The output of the phase sensitive detector 22 is positive which indicates that the piston 12 is between the ends of its stroke. When the cylinder is fully contracted, both coils 16 and 17 will be within the bore 13 and their impedances will be low. The bridge circuit incorporated in the electrical circuit shown in FIG. 2 will be balanced and the output of the detector 22 will go to zero again indicating another end of stroke condition. Subsequent movement of the piston 12 away from the end wall 15 to extend the hydraulic cylinder, will lead to the coil 16 emerging from the bore 13 so that its impedance will go high. The impedance of the coil 17 will remain low as it stays within the bore 13. Hence the output of the phase sensitive detector 22 will be positive again indicating the position of the piston 12 being intermediate the ends of its stroke.

A resistor 23 is inserted in series between the AC power source 20 and one of the resistors 21. Means are provided to measure the volt drop across the resistor 23, that volt drop being an indication of the end of the stroke of the piston 12 at which the piston 12 is when the bridge circuit incorporated in the electrical circuit shown in FIG. 2 is balanced. A current transformer may be used instead of the resistor 23 for this purpose.

FIG. 4 shows a modification of the device described above with reference to FIGS. 1 to 3, the modification leading to avoidance of the need for a current measuring device, such as the resistor 23, which is wasteful of power. Parts of the hydraulic cylinder shown in FIG. 4 that are similar to corresponding parts of the hydraulic cylinder shown in FIG. 1 are identified by the same reference characters. The modification comprises the coil 17 being clamped in position on the rod 14 such that it is always received within the bore 13, enlargement of the bore 13 and insertion into that enlarged bore of a composite tubular insert which lines it. The insert comprises a major tubular portion 25 and a tubular end portion 26 which is at the mouth of the bore 13. The major tubular portion 25 is formed of a non conducting material, such as a plastics material, and its axial length is at least equal to the sum of the axial spacing between the coils 16 and 17 and the length of the coil 17. The tubular end portion 26 is formed of a good electrically conducting material such as aluminium or copper, and its axial length is substantially the same as the axial length of each of the coils 16 and 17.

Figure 5:
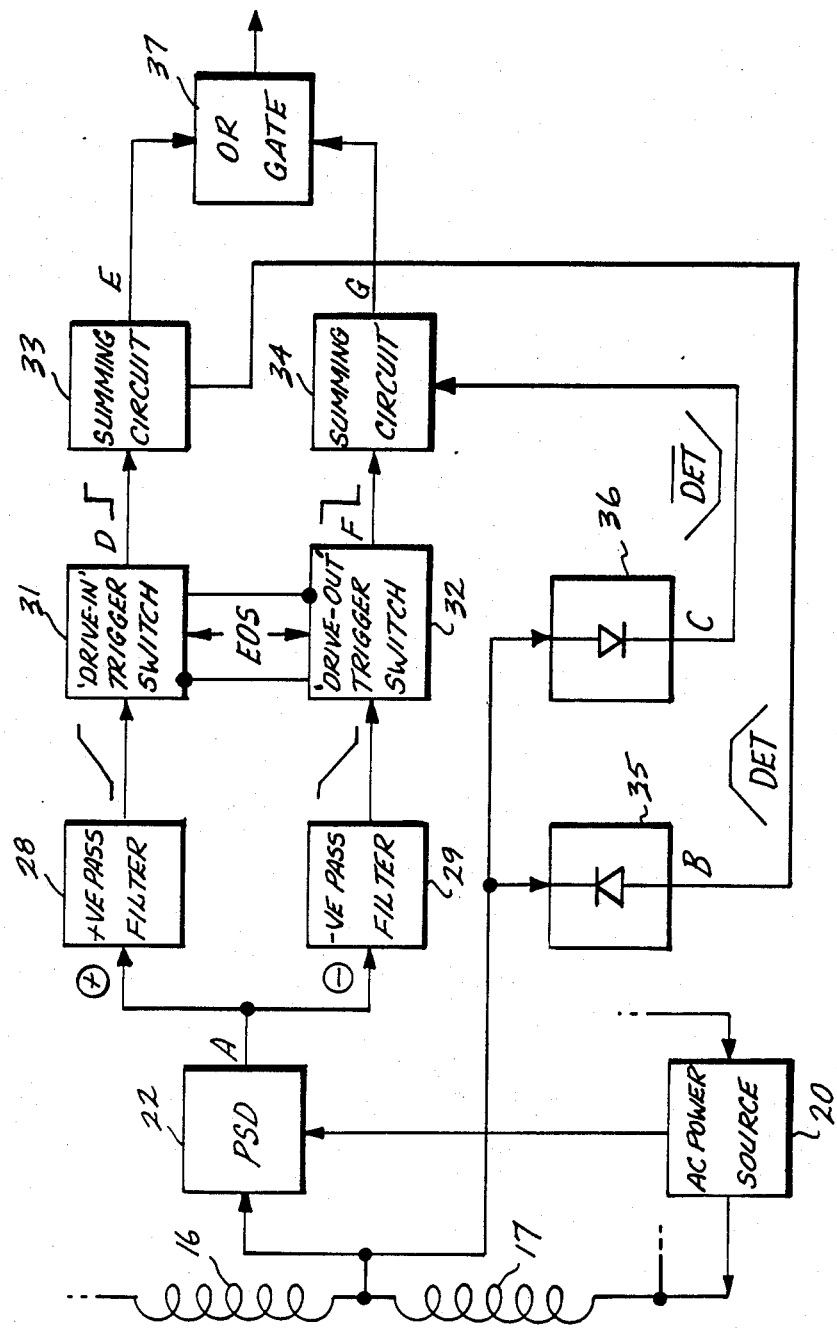
FIG. 5 is a logic diagram illustrating operation of electrical circuitry of the modified device illustrated in FIG. 4.

Operation of the device incorporating the modification illustrated in FIG. 4 is described now with reference to FIGS. 5 and 6, FIG. 5 being a logic diagram of the electronic circuitry for processing the output of the phase sensitive detector 22 which is connected in a bridge circuit substantially as described above with reference to FIG. 2, and for deriving from it a control signal for controlling an electromagnetic servo valve which controls flow to the cylinder to effect extension or contraction of the cylinder.

The centre tapping between the two coils 16 and 17 is connected to a diode 35 and to an inverted diode 36, each being in parallel with its connection to an input of the phase sensitive detector 22. The supply voltage of the power source 20 is applied to the phase sensitive detector 22 for use as a reference voltage.

Waveform A, as read from the left to the right in FIG. 6, is he waveform of the output of the phase sensitive detector 22 compared with displacement of the cylinder as the cylinder contracts from its fully extended position to its contracted position shown in dotted lines in FIG. 4. The phase sensitive detector 22 is set so that its output is high when the cylinder is fully extended, the coil 16 being outside the bore of the tubular insert and the coil 17 being wholly surrounded by the tubular end portion 26, is zero when the coil 16 is outside the bore of the tubular insert and the coil 17 is wholly surrounded by the major tubular portion 25, and is low when both coils 16 and 17 are positioned within the bore of the tubular insert, the coil 16 being wholly surrounded by the tubular end portion 26. It will be seen from waveform A that the output reduces from its high to zero, with a linear slope, as the tubular end portion 26 is moved away from its position wholly surrounding the coil 17 and towards the coil 16, which is indicated in FIG. 6 as the 'OUT' phase. That output signal remains zero as the tubular end portion 26 is moved towards the coil 16, which is identified as the 'TRAVERSE' phase in FIG. 6, and reduces from zero to its low with a linear slope as the tubular end portion 26 is passed over the coil 16 into the position in which it wholly surrounds the coil 16 which occurs during the final part of contraction of the cylinder and which is identified as the 'IN' phase in FIG. 6. It will be understood that the output signal of the phase sensitive detector 22 will rise with a linear slope from its low during the initial part of extension of the cylinder until the coil 16 has completely emerged from within the bore of the tubular insert. The output will remain at zero whilst the major portion of the tubular insert traverses the gap between the coils 16 and 17 and will increase again with a linear slope to its high as the tubular end portion 26 is passed across the coil 17 into the position in which it wholly surrounds the coil 17 which occurs when the cylinder is fully extended.

Waveform B of FIG. 6 is the waveform of the output of the diode 35 and it reflects the changes in the impedance of the two coils 16 and 17 as the tubular end portion 26 moves out of a mutual inductively linked relationship with the coil 17, traverses the space between the coils 16 and 17 and moves into a mutual inductively linked relationship with the coil 16 as the cylinder contracts. Waveform B shows that the output of diode 35 increases from a low to zero with a linear slope during the 'OUT' phase, is zero through the 'TRAVERSE' phase, and decreases from zero to the low with a linear slope during the 'IN' phase. Waveform C is the waveform of the output of the inverted diode 36 and is an inversion of the output of the diode 35.

The output of the phase sensitive detector 22 is directed in parallel to the inputs of two filter devices 28 and 29. The filter device 28 passes the positive portions of the waveform A to an input of a 'Drive In' trigger switch 31. The filter device 29 passes the negative portions of the waveform A to an input of a 'Drive Out' trigger switch 32. The trigger switches 31 and 32 are interconnected so that triggering of one of them inhibits operation of the other. The 'Drive In' trigger switch 31 is triggered automatically by the phase sensitive detector 22 as the piston 12 approaches the end of its stroke at which the cylinder is extended, that condition being when the rising output of the phase sensitive detector 22 reaches a preselected level [EOS (OUT)] between zero and its high (or at the high if desired). The 'Drive Out' trigger switch 32 is triggered automatically by the phase sensitive detector 22 as the piston 12 approaches the end of its stroke at which the cylinder is contracted, that condition being when the falling output of the phase sensitive detector 22 reaches a preselected level [EOS (IN)] between zero and its low (or at that low if desired). The trigger switch 31 is adapted to emit a positive output voltage when triggered and to apply that output voltage to one input of a summing circuit 33. The output of the diode 35 is applied to another input of the summing circuit 33. The trigger switch 32 is adapted to emit a negative output voltage when triggered and to apply that negative output voltage to one input of a summing circuit 34. The output of the inverted diode 36 is applied to another input of the summing circuit 34.

The output of the summing circuit 33 has a waveform E as shown in FIG. 6 and is applied to one input of an OR gate 37. The output of the summing circuit 34 has a waveform G as shown in FIG. 6 and is applied to another input of the OR gate 37. The output of the OR gate 37, which has either the waveform E or the waveform G, is applied to effect energisation of the winding of the electromagnetic servo valve.

It should be understood that, as is the case with all the waveforms A, B, C, E and G, the signal that is transmitted to energise the winding of the electrohydraulic servo valve is only changed with a linear slope when compared with spatial displacement of the piston 12. When compared with time, the change in that signal will be exponential. Consequently acceleration and deceleration of the piston 12 at either end of its stroke will be exponential which is appropriate for operation of an hydraulic cylinder.

In addition to sensing movement of the piston 12 relative to the cylinder casing 11 and generating the waveforms A, B, C, E and G as described, the electronic circuitry illustrated in FIG. 5 operates to control continuous reciprocating movement of the piston 12 within the cylinder casing 11 automatically. Assuming that the piston 12 is in the TRAVERSE phase moving away from the closed end wall 15 of the cylinder casing 11 to extend the cylinder, the outputs from the phase sensitive detector 22, the diode 35 and the inverted diode 36 will be zero as will be the inputs to the trigger switches 31 and 32. The 'Drive Out' trigger switch 32 will be emitting a negative output whilst the 'Drive In' trigger switch 31 is inhibited. That negative output from the 'Drive Out' trigger switch 32 will be transmitted via the summing circuit 34 to effect energisation of the solenoid winding of the electrohydraulic servo valve such that that valve is set to supply hydraulic fluid to the cylinder space between the piston 12 and the closed end wall 15 and to connect the cylinder space on the other side of the piston 12 to drain. Those conditions continue unchanged until the end of the tubular end portion 26 that abuts the major tubular portion 25 is moved sufficiently close to the coil 17 for the coil 17 to be mutually inductively linked with the tubular end portion 26. This occurs at point 'a' in the waveform G as shown in FIG. 6. The consequent changes in the impedance of the coil 17, which are reflected in the increase with a linear slope in the output from the inverted diode 36 that is added to the negative output F of the 'Drive Out' trigger switch 32 in the summing circuit 34, lead to the magnitude of the output from the summing circuit 34 that is transmitted via the OR gate 37 to energise the winding of the electrohydraulic servo valve, being reduced with a linear slope. There is a consequent increasing restriction in the supply of hydraulic fluid to drive the piston 12 away from the closed end wall 15 caused by operation of the electrohydraulic servo valve. Hence movement of the piston 12 away from the closed end wall 15 is retarded exponentially until the piston 12 reaches the preselected position EOS (OUT) adjacent the end of its stroke at which the cylinder is fully extended (indicated by point 'b' in the waveforms E and G of FIG. 6) at which the 'Drive In' trigger switch 31 is triggered which in turn inhibits the 'Drive Out' trigger switch 32. Hence the output from the 'Drive Out' trigger switch 32 is discontinued, as that switch 32 was inhibited by the triggering of the 'Drive In' trigger switch 31, whilst the 'Drive In' trigger switch 31 emits a positive output. That positive output (waveform D of FIG. 6) is added in the summing circuit 33 to the output of the diode 35 (waveform B of FIG. 6). The consequent output of the summing circuit 33 (waveform E of FIG. 6), which is transmitted via the OR gate 37 to effect energisation of the solenoid winding of the electrohydraulic servo valve, increases with a linear slope and in the opposite sense to the output signal that was previously transmitted via the OR gate 37 from the summing circuit 34. Hence hydraulic connections of the electrohydraulic servo valve are switched so that the cylinder space between the piston 12 and the closed end wall 15 is connected to drain and hydraulic fluid under progressively increasing pressure is fed to the cylinder space on the other side of the piston 12 so as to urge the piston 12 towards the closed end wall 15 and effect exponential acceleration of that piston 12.

Acceleration of the piston 12 with an exponential slope increases until the output from the diode 35 stops increasing which occurs when the tubular end portion 26 is moved out of its mutual inductively linking relationship with the coil 17 (see point 'c' in waveform E). Steady state conditions prevail and the piston 12 is driven towards the closed end wall 15. Those steady state conditions prevail until the end of the tubular end portion 26 near the closed end wall 15 is sufficiently close to the coil 16 for it to be in mutual inductively linking relationship with the coil 16. This occurs at point 'd' in waveform E. The consequent progressive reduction in the output from the diode 35 leads to there being a similar progressive reduction in the signal that is transmitted from the output of the summing circuit 33 via the OR gate 37 to the electrohydraulic servo valve so that movement of the piston 12 towards the closed end wall 15 is retarded exponentially. That situation continues until the piston 12 reaches the position EOS (IN) relative to the closed end wall 15 (indicated at point 'e' in waveform E of FIG. 6) at which the 'Drive Out' trigger switch 32 is triggered, the 'Drive In' trigger switch 31 being inhibited in consequence. Hence the signal that is the output of the summing circuit 33 and that had the waveform E of FIG. 6 that was responsible for energisation of the winding of the electrohydraulic servo valve via the OR gate 37 is replaced by the signal that is emitted by the summing circuit 34 (point 'e' of the waveform G of FIG. 6) and the magnitude of that signal increases with a linear slope to effect return movement of the piston 12 away from the closed end wall 15 until steady state conditions are established again at point 'f' in waveform G for the TRAVERSE phase of the extension of the hydraulic cylinder.

Thus the device described with reference to FIGS. 4 to 6 operates to sense approach of the piston 12 to either end of its stroke and automatically retards the piston 12 exponentially at either end of its stroke and accelerates the piston 12 exponentially away from either end of its stroke during continuous reciprocation of the piston 12.

It is not essential that the modification described above with reference to FIG. 4 be used as described with reference to FIGS. 5 and 6 to control an electrohydraulic servo valve which controls flow to the cylinder to effect automatic reciprocatory extension and contraction of the cylinder. The derived control signal may be used to cause operation of a simple reversing valve to effect simple reversal of the piston without exponential deceleration and acceleration.

FIGS. 7 and 8 show an hydraulic cylinder fitted with a displacement measurement device substantially as described with reference to FIGS. 6 and 6A of the drawings filed with our European Patent Application No. 84307768.6, our Canadian Patent Application Serial No. 467078 and our U.S. patent application Ser. No. 668,749, now U.S. Pat. No. 4,644,355, which comprises an output coil arrangement comprising two bifilar coils in quadrature positioned substantially coaxially between two drive coils 40 and 41 and mounted on a probe which projects axially into an axial bore 43 in the piston rod 42 from the closed end wall of the cylinder body 46. Intermediate coils with shorted end turns are wound on two tubular formers 44 and 45 which are spigotted into the axial bore 43.

The two drive coils 40 and 41 are energised by an applied alternating current when the displacement measurement device is operated. Current flow is induced through the adjacent intermediate shorted turn coils which are linked with the magnetic flux generated by the energising current flow in the drive coils 40 and 41. That induced current flow through the adjacent shorted turn coils in turn induces current flow through the output coil arrangement. Movement of the piston rod 42 relative to the cylinder body 46 causes variation in the alternating current flow through the winding portions in quadrature of the output coil arrangement. This is demodulated to produce sine and cosine output signals which are processed by signal processing means to provide an instantaneous indication of displacement of the piston rod 42 relative to the cylinder body 46. During the signal processing the sine and cosine signals are blended to produce a time phase signal.

The drive coils 40 and 41 are used as the spaced pair of series connected coils of a device in which this invention is embodied which operates in response to initiation of movement of the piston rod 42 from one end of its stroke to establish a datum for the displacement measurement.

As is described in those co-pending applications, the axial bore 43 in the piston rod 42 is extended beyond the outer ends of the two tubular formers 44 and 45 on which are wound the intermediate induction coils of the displacement measurement device which have their end turns short circuited. Such extension of the bore 43 allows each drive coil 40, 41 to project from the respective end of the formers 44 and 45 when the cylinder is either contracted (as shown in FIG. 7) or extended (as shown in FIG. 8).

The leads to the drive coils 40 and 41 are connected outside the cylinder casing 46 into an electric circuit as shown in FIG. 2, each drive coil 40, 41 being in the place of a respective one of the coils 16 and 17.

The output from the phase sensitive detector is arranged to control operation of switching means incorporated in the signal processing means. The switching means either inhibit or enable transmission to one input of a comparator of the time phase signal that is formed by blending the sine and cosine output signals from the output coil arrangement, in parallel with the transmission of that time phase signal to the means from which the instantaneous indication of displacement of the piston rod 42 is derived. A preselected reference signal is applied to the other input of the comparator which is adapted to emit an output when the time phase signal equals the preselected reference signal. The output of the comparator is fed to the means from which the instantaneous indication of displacement of the piston rod 42 is derived for use as a datum for the displacement measurement.

In use of the apparatus shown in FIGS. 7 and 8, when either drive coil 40, 41 emerges from the respective end of the tubular formers 44 and 45, an out of balance signal is emitted by the phase sensitive detector 22. That out of balance signal is fed to the switching means which are thereby enabled to transmit the time phase signal to the comparator so that the datum set reference for displacement measurement is set when the time phase signal equals the reference signal.

By this arrangement any preselected instance when a selected one of the sine or cosine output signals from the output coil arrangement crosses zero can be arranged to trigger generation of the datum set reference for displacement measurement which leads to the datum set reference being set with a greater degree of accuracy than would be the case if it were derived directly from the output of the phase sensitive detector 22. Such a datum set reference can be linearly proportional to the amount the respective drive coil 40, 41 protrudes and indicative of which of the two coils 40 and 41 is protruding. The datum set reference signal generating means may be preset to trigger at a desired moment of protrusion so as to suit characteristics of the measurement coils on the formers 44 and 45.

Figure 9:
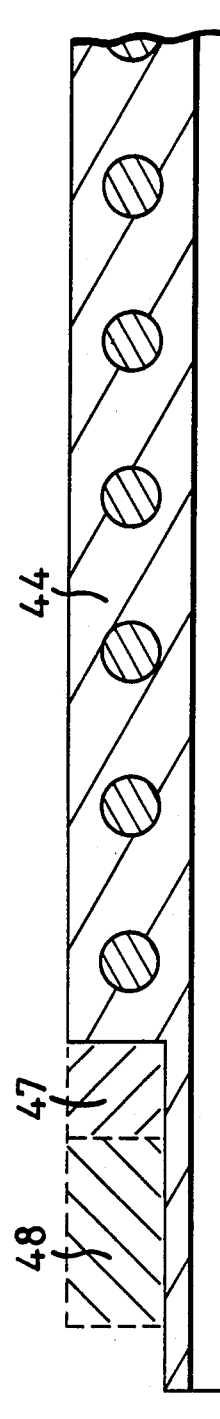
FIG. 9 is a diagram which illustrates a modification of FIG. 7.

The relative change of state of the impedance of either drive coil 40, 41 as it emerges from the bores of the tubular formers 44 and 45 at either end thereof can be varied to suit requirements by the use of one or more annular inserts of good electrically conducting material, (such as aluminium or copper), as shown at 47 and 48 in FIG. 9. In the absence of such an insert 47, 48, the impedance of a drive coil 40, 41 changes progressively between its high and low limits as the respective coil 40, 41 traverses the end of the intermediate induction coils wound on the formers 44 and 45. Use of an annular insert 47 of good electrically conducting material, which has an axial length substantially equal to the difference between the length of either drive coil 40, 41 and the distance between the end of the axial bore 43 and an adjacent end of an intermediate induction coil, ensures that the impedance of the drive coil 40 does not rise to its high until it reaches the end of its stroke at the end of that bore 43. Provision of another annular insert 48 further delays increase in the impedance of the emerging drive coil 40, in which case the output of the phase sensitive detector 22 should be arranged to be triggered earlier and at a lower impedance because the drive coil 40 would be only partly emerged from the inserts 47 and 48 when it reaches the respective end of its stroke.

Such a progressively increasing impedance of the drive coil 40, 41 as it approaches the respective end of the stroke of the piston 42 can be used as an indication of approach of the end of the stroke of the piston 42 and can be arranged to trigger means operative to effect end of stroke cushioning to minimise impact forces at the end of the stroke. To this end the signal processing system may incorporate electronic circuitry for processing the output of the phase sensitive detector 22 which is connected in the bridge circuit shown in FIG. 2, and for deriving from it a control signal for controlling an electrically modulated control valve which controls flow to the cylinder to effect extension or contraction of the cylinder.

Figure 10:
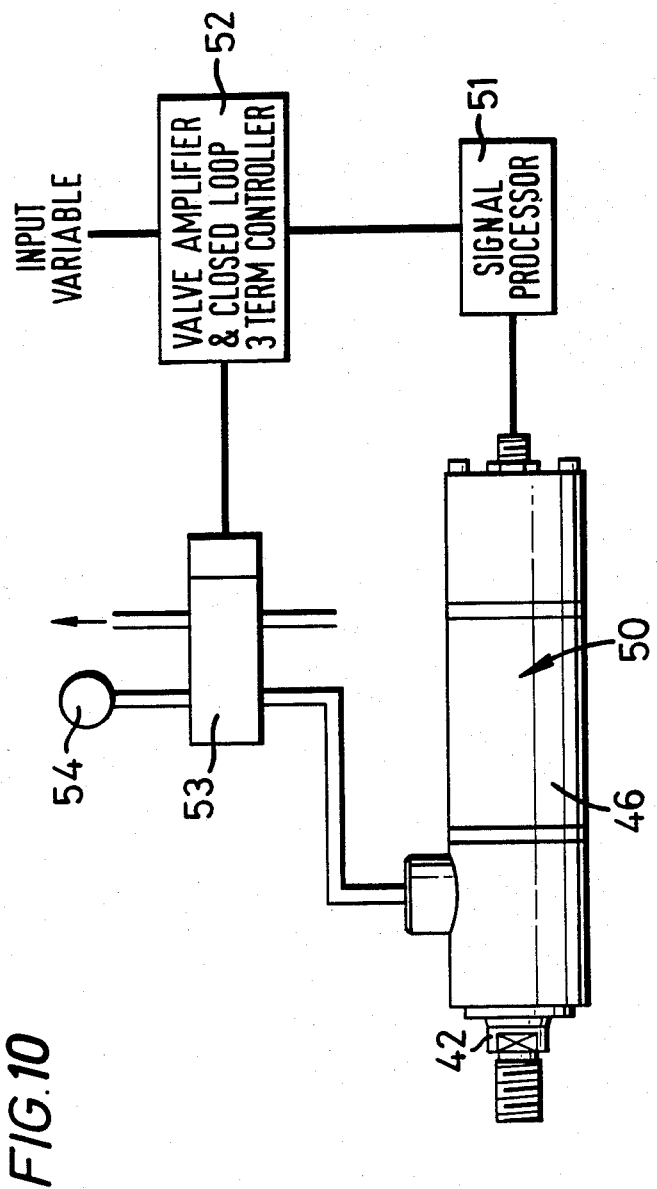
FIG. 10 is a diagram of an electrohydraulic control system for the cylinder shown in FIGS. 7 and 8.

FIG. 10 shows such an electrically modulated control valve 53 having two ports each connected to a respective one of the two ports of the hydraulic cylinder 50 which is as shown in FIGS. 7 and 8. The valve 53 is operable under the control of a signal processor 51 via a valve amplifier and closed loop 3 term controller 52 to selectively connect one of the ports of the cylinder 50 to a source 54 of fluid under pressure and to connect the other port of the cylinder 50 to a reservoir. The output leads from the output coil assembly are connected to an input of the signal processor 51 which conveniently comprises electronic circuitry that is described above with reference to FIGS. 5 and 6 but modified to cater for the fact that both drive coils 40 and 41 are inductively linked with the shorted turn coil arrangement during the 'TRAVERSE' phase of movement rather than being not so linked during that phase.

In addition to sensing movement of the piston rod 42 relative to the cylinder casing 46 and generating signals to effect energisation or de-energisation of the winding of the control valve 53 at either end of the stroke of the piston rod 42, the electronic circuitry may operate to control continuous reciprocating movement of the piston rod 42 within the cylinder casing 46 automatically. Basically changes in the impedance of either coil 40, 41, which occur with a slope consequent upon the emergence of that coil 40, 41 from within the respective former 44, 45 lead to the magnitude of the signal that energises the winding of the control valve 53, being reduced with a similar slope. There is a consequent increasing restriction in the supply of hydraulic fluid to drive the piston rod 42 in the direction in which it is being driven by operation of the control valve 53. Hence movement of the piston rod 42 is retarded until it reaches a preselected position adjacent the end of its stroke at which the cylinder 50 is fully extended or contracted. The hydraulic connections of the control valve 53 are then switched automatically so that the piston rod 42 is urged in the other direction.

Acceleration of the piston rod 42 follows from reentry of the coil 40, 41 into the respective former 44, 45 and the consequent change in its impedance, and increases until both coils 40 and 41 are wholly within the tubular formers 44 and 45. Steady state conditions prevail until the other coil 40, 41 starts to emerge from the other tubular former 44, 45. The consequent progressive change in the impedance of the emerging coil 40, 41 leads to there being a similar progressive reduction in the signal that is transmitted to the control valve 53 so that movement of the piston rod 42 is retarded. That situation continues until the piston rod 42 reaches a position relative to the other end of its stroke at which the hydraulic connections are switched again and the process repeated.

Thus the device described with reference to FIGS. 7 to 9 can operate to sense approach of the piston rod 42 to either end of its stroke, to automatically retard the piston rod 42 at either end of its stroke and accelerate the piston rod 42 away from either end of its stroke during continuous reciprocation of the piston rod 42.

FIG. 11 shows three tubular formers 55, 56 and 57 of electrically insulating material which are spigotted end to end into the axial bore 43 formed in the piston 42 of the hydraulic cylinder 50 when the transducer is installed. A coil 61, 62, 63 is wound upon the radially outer surface of each former 55-57. The coils 61, 62 and 63 are electrically similar and conveniently this is achieved by using coils having the same number of turns which are wound uniformly on a respective former 55-57 and which have the same length. The end turns of each coil 61, 62 and 63 are short circuited by a respective shunt connection. Each end turn of the middle coil 62 of the three coils 61, 62 and 63 is as close to touching the adjacent end turn of the adjacent coil 61 or 63 as is possible commensurate with the space necessary for shunt connection and the integrity of a substantially continuous helix formed by the three coils 61-62.

A probe 64 projects axially from the closed end wall of the hydraulic cylinder 50 into the bore of the three tubular formers carried by the piston 42. Three coils are fitted coaxially to the probe 64 at its end remote from the closed end of the hydraulic cylinder 50. These coils comprise an output coil 65 which is between two drive coils 70 and 71.

The three coils 65, 70 and 71 cooperate with the three shorted turn coils 61-63 to provide an output signal indicative of relative displacement between the piston 42 and the cylinder body 46 of the hydraulic cylinder 50 substantially as is described in our European Patent Application No. 84307768.6, our Canadian Patent Application Serial No. 467078 and our U.S. patent application Ser. No. 668,741, now U.S. Pat. No. 4,644,355.

A third drive coil 72 is mounted on the probe 64 between the nearer, 71 of the two drive coils 70 and 71 that that are separated by the output coil 65 and the closed end wall of the cylinder 50. Conveniently the third drive coil 72 is similar to the other two drive coils 70 and 71. The distance between the third drive coil 72 and the nearer, 71 of the other two drive coils 70 and 71 exceeds the sum of the distance between the magnetic centres of the other two drive coils 70 and 71 and the length of one of the other two drive coils 70 and 71 so that no part of the third drive coil 72 can be in mutual inductance with the same shorted turn coil 61-63 as the nearer, 71 of the other two drive coils 70 and 71. The three drive coils 70-72 are connected across a source of A.C. power and are in a bridge circuit which includes a phase sensitive detector. The third drive coil 72 is connected into one arm of the bridge circuit. The first and second drive coils 70 and 71 are connected in series in another arm of the bridge circuit. The junction between those two arms of the bridge circuit is connected to one terminal of the phase sensitive detector. Appropriate value resistors are connected into the other two arms of the bridge circuit. The bridge circuit is arranged to emit an output where the impedance of any one of the three drive coils 70-72 changes.

Although the spacing between the third drive coil 72 and the nearer, 71 of the other two drive coils 70 and 71 has a minimum comprising the sum of the distance between the magnetic centres of the other two drive coils 70 and 71, and the length of one of those other two drive coils 70 and 71, its actual length is variable in practice and is chosen with the requirement for a datum signal to be established at a certain point between the ends of the stroke of the piston 42 of the hydraulic cylinder 50.

As the hydraulic cylinder 50 extends, the drive coil 72 emerges from the end of the shorted turn coil 63 that is nearer to the closed end wall of the cylinder 50, the shorted turn coil 63 being the one of the three shorted turn coils 61-63 that is nearest to the closed end wall of the cylinder 50. The impedance of the drive coil 72 is changed as it emerges from the bore of the tubular former on which the shorted turn coil 63 is wound. Such change in the impedance of the drive coil 72 is sensed by the phase sensitive detector and an output signal is generated electronically to provide a datum reset. Known electronic circuitry can be employed to ensure switching in one or both directions as the application may dictate.

The arrangement shown in FIG. 12 costs less than the arrangement shown in FIG. 11 and does not require provision of a third drive coil.

FIG. 12 shows a displacement transducer similar to that shown in FIG. 11 but modified by the removal of the third drive coil 72 and by the addition of a subsidiary shorted turn coil 66 of wire which may comprise a single turn or a plurality of turns. The subsidiary shorted turn coil 66 is wound around and spaced from a selected one of the three shorted turn coils 61 to 63 (e.g. the central one 62 as shown in FIG. 12 by way of example) at a location which corresponds to the datum point between the ends of the stroke of the piston 42 that is to be established as an intermediate datum point for the hydraulic cylinder 50.

The subsidiary shorted turn coil 66 is spaced radially from the respective shorted turn coil 61 to 63 that it surrounds by a distance which is thought to be sufficient for it to not significantly affect the signal strength of the signals detected by the output coil arrangement 65 which is wound in spatial quadrature. It does, however, change the impedance of the drive coils 70 and 71 as they pass through it with movement of the piston 42. The phase sensitive detector of the associated bridge circuit responds to such a change in impedance of a selected one of the drive coils 70 and 71 to give a datum point reset signal.

Both drive coils 70 and 71 may pass through the subsidiary shorted turn coil 66 as the piston 42 moves from one end to the other of its stroke. Hence there is a potential for achievement of two datum signals should they be required. When only one datum reset signal is required, as is normally the case, the second signal is distinguishable readily because the two signals are the inverse of one another, the change in impedance of one of the drive coils 70 and 71 being indicated by a high output signal whilst the change in impedance of the other drive coil 70, 71 is indicated by a low output signal.

Known electronic circuitry can be employed to ensure switching in one or both directions of travel of the piston 42 as is required by the application of the hydraulic cylinder 50.

We claim:

1. An inductive transducer for deriving an output signal from relative movement between two relatively displaceable parts, comprising at least two coils fixedly supported by a first of the two parts substantially coaxially with and spaced from one another in the direction of relative displacement between said two parts, a shorted turn arrangement incorporated in the second part such that it is movable into and out of mutual induction with each of said coils at respective parts of the range of possible relative movement between the two parts, and means which are responsive to change in the inductance of said coils, and which are operable to emit an output signal, said means including a bridge circuit having indicating means connected between the junctions of two pairs of arms of the bridge circuit, a first coil of said at least two coils being connected into one of the arms of one of the pairs and the remainder of said at least two coils being connected into the other arm of said one of the pairs, said transducer indicating establishment of a preselected spatial relationship between the two parts by indicating occurrence of predetermined transient conditions related to a change in the inductance of either said first coil or a change in the inductance of at least one of said remaining coils between constant and varying conditions of the inductance of a coil which occurs as that coil moves into and out of mutual induction with the shorted turn arrangement.

2. An inductive transducer according to claim 1, wherein there are two coils and said means operable to emit an output are operable to emit such an output signal when the inductance of both the coils is the same.

3. An inductive transducer according to claim 2, wherein means are provided whereby one of two predetermined spaced locations of said one part relative to the other part at which the inductance of the coils is the same is distinguishable from the other such location.

4. An inductive transducer according to claim 1, wherein said means operable to emit an output are operable to emit such an output signal when the inductance of the coils is not the same because one of them is not inductively linked with the shorted turn arrangement whilst the remainder is.

5. An inductive transducer according to claim 1, wherein said means responsive to change in the inductance of the coil are operable to emit a signal which changes progressively with change of inductance as the respective predetermined spatial relationship is approached, said means operable to emit an output being responsive to said signal and being adapted to emit said output when said signal has a predetermined magnitude.

6. An inductive transducer according to claim 1, wherein said second part forms a cylindrical metal shroud of good electrically conductive material which serves as said shorted turn arrangement and which surrounds said coil or when mutually inductively linked with it.

7. An inductive transducer according to claim 4, where said shorted turn arrangement comprises at least one coil having short circuited end turns.

8. An inductive transducer according to claim 7, wherein said means responsive to change in the inductance of the coil are operable to emit a signal which changes progressively with change of inductance as the respective predetermined spatial relationship is approached, said means operable to emit an output being responsive to said signal and being adapted to emit said output when said signal has a predetermined magnitude, and said second part carries an annular insert substantially coaxially with and juxtaposed with said shorted turn arrangement, said annular insert being formed of a good electrically conductive material.

9. An inductive transducer according to claim 8, wherein said second part carries another annular insert juxtaposed to the annular insert of good electrically conductive material, the other annular insert being formed of a material having a conductivity intermediate that of ferromagnetic material and good electrically conductive material.

10. An inductive transducer according to claim 1, wherein the fixed support of the coil on said first part is adjustable.

11. An inductive transducer according to claim 7, wherein two of the at least two coils on said first part are drive coils of a displacement measurement device which is operable to measure relative displacement between the two parts and which also comprises an output coil arrangement which is mounted on said first part substantially coaxially with and between the two drive coils, and an intermediate coil arrangement which comprises the shorted turn arrangement mounted on the other of the two parts substantially coaxially with the drive coils and the output coil arrangement, the device being arranged such that, with the drive coils energised simultaneously by an applied alternating current signal, alternating current flow is induced through the intermediate coil arrangement and through the output coil arrangement by the applied alternating current flow through the drive coils and by the induced current flow through the intermediate coil arrangement respectively, the current flow through the output coil arrangement serving as an output signal which is indicative of measured relative displacement between the two parts.

12. An inductive transducer according to claim 1, in which two of the coils on the first part are drive coils of a displacement measurement device which is operable to measure relative displacement between the two parts, which have a stroke of relative movement with two ends, and which also comprises an output coil arrangement which is mounted on said first part substantially coaxially with and between the two drive coils; and a shorted turn coil arrangement which is mounted on the other of the two parts substantially coaxially with the drive coils and the output coil arrangement; the displacement measurement device being arranged such that, the drive coils energised simultaneously by an applied alternating current signal alternating current flow is induced through the shorted turn coil arrangement and through the output coil arrangement by the applied alternating current flow through the drive coils and by the induced current flow through the shorted turn coil arrangement respectively, the current flow through the output coil arrangement serving as an output signal which is indicative of measured relative displacement between the two parts; wherein there are provided means which are operable to indicate when one of the two parts is at a preselected location relative to the other between the ends of the stroke of relative movement between the two parts, said means comprising a coil element and an associated shorted turn element which are each fitted to a respective one of the two parts such that, as said one part moves to said preselected location, the inductance of the coil element is changed by movement of it into or out of mutual induction with the shorted turn element.

13. An inductive transducer according to claim 12, wherein the coil element is one of the drive coils and the shorted turn element is a subsidiary shorted turn coil which is mounted on said other part such that said one drive coil is also in mutual induction with said shorted turn coil arrangement when it is in mutual induction with it and such that it is radially spaced sufficiently from the axis of said drive coils and the output coil arrangement for it to have virtually no effect on the strength of said output signal.

14. An inductive transducer according to claim 12, wherein the coil element is a third drive coil which is supported by said first part substantially coaxially with the other two drive coils and the output coil arrangement, and the shorted turn element comprises said shorted turn coil arrangement, the third drive coil being spaced from the nearer of the other two drive coils by a distance which is at least the sum of the length of either of the other two drive coils and the distance between the magnetic centres of the other two drive coils.

15. An inductive transducer for deriving an output signal from relative movement between two relatively displaceable parts, comprising first and second coils fixedly supported by said first part substantially coaxially with and spaced from one another in the direction of relative displacement between said two parts, the second part comprising a cylindrical metal shroud of good electrically conductive material which is a shortened turn arrangement and which is movable into and out of mutual induction with the coil during relative movement between the two parts, said shroud surrounding said coil when mutually inductively linked with it, and means which are responsive to change in the inductance of the coil, and which are operable to emit an output signal, wherein the transducer is adapted to indicate establishment of a preselected spatial relationship between the two parts by indicating when predetermined transient conditions related to a change in the inductance of the coil between constant and varying conditions of the inductance of the coil which occur as the coil moves into and out of mutual induction with the shorted turn arrangement, are established, said means operable to emit an output operable to emit such an output signal when the inductance of said first and second output signal coils is not the same because one of them is not inductively linked with the shorted turn arrangement whilst the other is, and wherein said cylindrical metal shroud is only part of an axially extending cylindrical surface formed by said second part so as to surround either coil during coaxial relative movement between said two parts, the remainder of said axially extending cylindrical surface being formed of non-conducting material.

* * * * *

UNITED STATES PATENT AND TRADEMARK OFFICE
CERTIFICATE OF CORRECTION

PATENT NO. : 4,855,675

DATED : August 8, 1989

INVENTOR(S) : Alexander Russell et al.

It is certified that error appears in the above-identified patent and that said Letters Patent is hereby corrected as shown below:

| Column | Line | Error |
|--------|------|-------|
| 2 | 42 | "affect" should be --effect-- |
| 2 | 44, 45 | "exitation" should be --excitation-- |
| 4 | 55 | delete the colon (":") after "diagram" |
| 5 | 10 | "negligable" should be --negligible-- |
| 6 | 52 | "non conducting" should be --nonconducting-- |
| 7 | 10 | "he" should be --the-- |
| 15 | 62 | "where" should be --wherein-- |
| 16 | 51 | insert --with-- after "that," |
| 16 | 52 | insert a comma (",") after "signal" |
| 18 | 2, 3 | "shortened" should be --shorted-- |

Signed and Sealed this

Third Day of December, 1991

*Attest:*

HARRY F. MANBECK, JR.

*Attesting Officer*     *Commissioner of Patents and Trademarks*